W. CANNELL.
MACHINE AND PROCESS FOR CUTTING HOBS, WORMS, AND THE LIKE.
APPLICATION FILED DEC. 5, 1914.
1,271,662.
Patented July 9, 1918.
3 SHEETS—SHEET 2.
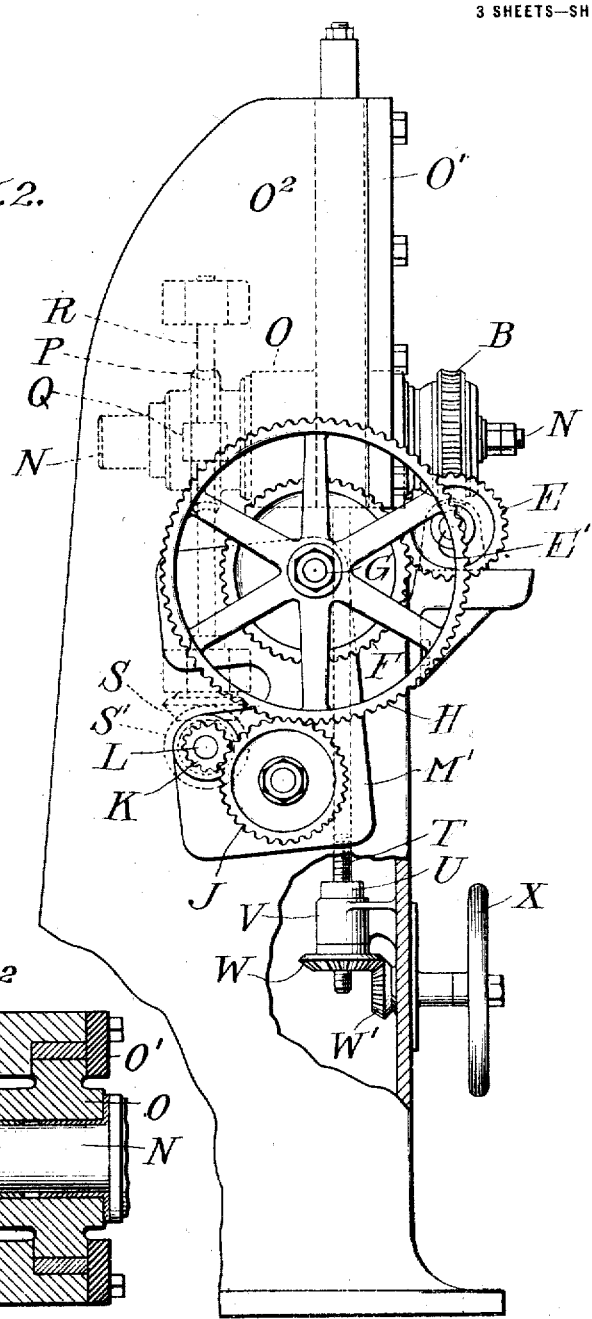
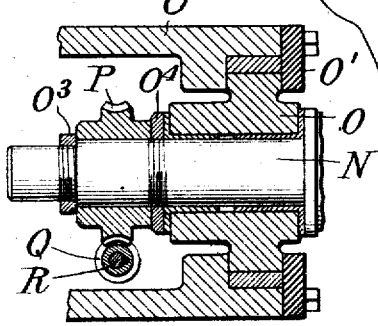

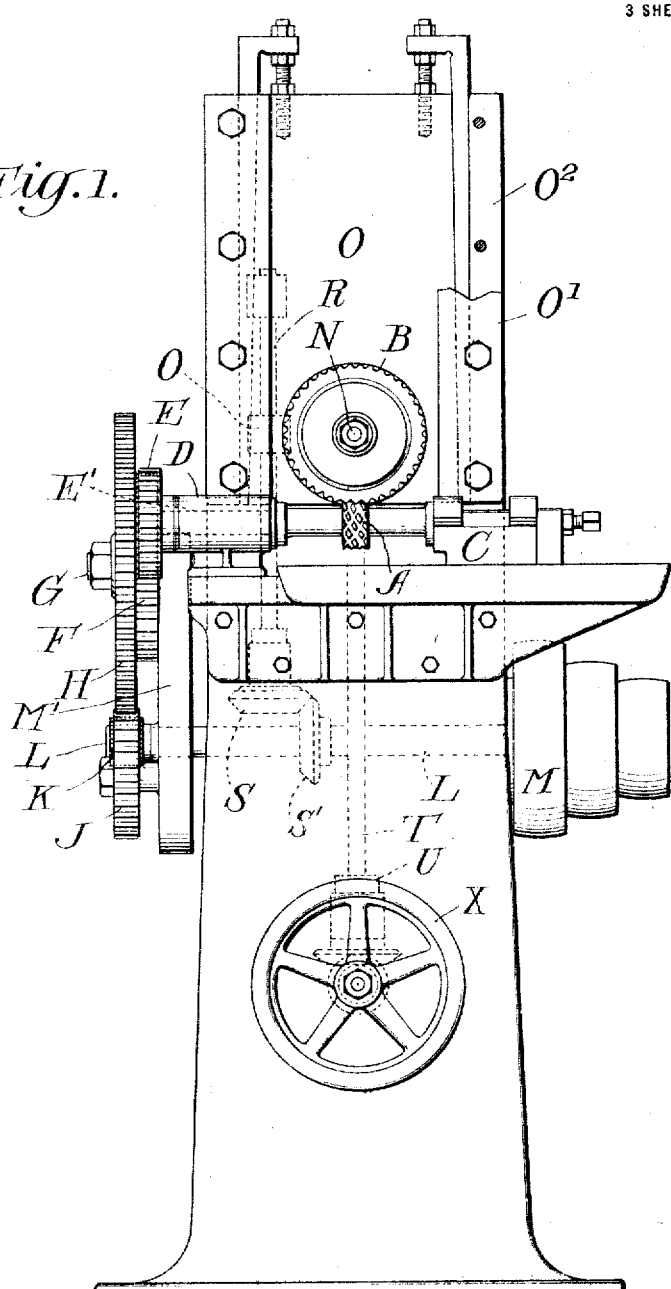

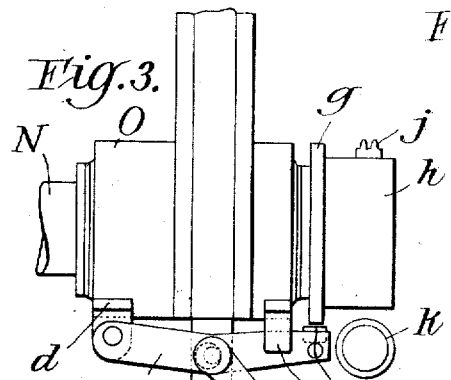
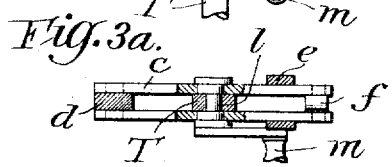
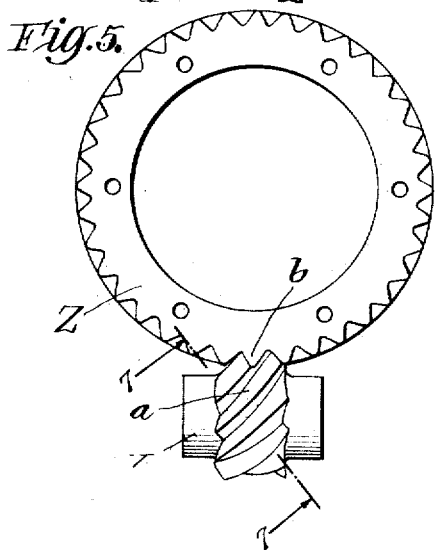
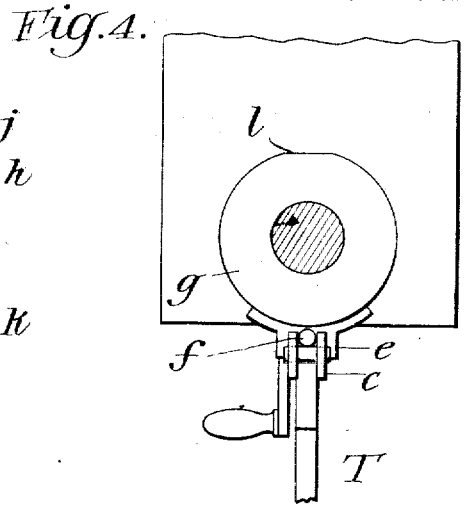
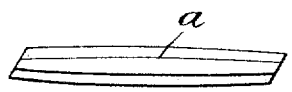
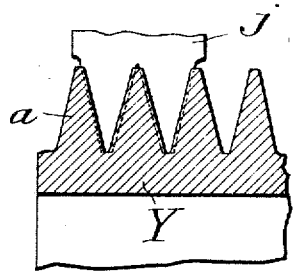

UNITED STATES PATENT OFFICE.

WILLIAM CANNELL, OF SPRINGFIELD, MASSACHUSETTS, ASSIGNOR TO BAUSH MACHINE TOOL COMPANY, A CORPORATION OF MASSACHUSETTS.

MACHINE AND PROCESS FOR CUTTING HOBS, WORMS, AND THE LIKE.

1,271,662.  Specification of Letters Patent.  Patented July 9, 1918.

Application filed December 5, 1914. Serial No. 875,654.

*To all whom it may concern:*

Be it known that I, WILLIAM CANNELL, a subject of Great Britain, and a resident of Springfield, Massachusetts, have invented certain new and useful Improvements in Machines and Processes for Cutting Hobs, Worms, and the like, of which the following is a specification.

This invention provides an improved style of worm or hob for cutting worm gears and the like and provides also a method and apparatus by which the improved hobs and worms can be cut accurately and rapidly, the machine determining automatically the desired curvature of the teeth of the work. The accompanying drawings illustrate an embodiment of the invention.

Figure 1 is a front elevation of a hobbing machine employed in cutting a worm gear;

Fig. 2 is a side elevation of the same;

Fig. 3 is a side elevation of a portion of said machine when fitted for cutting a worm or hob by means of a fly cutter or single cutter;

Fig. 3ª is a plan of a detail, partly in section;

Fig. 4 is a front elevation of Fig. 3 omitting the cutter and the work;

Fig. 5 is a side elevation of a worm and worm gear made in accordance with the invention;

Fig. 6 is a developed plan of one of the teeth of the worm;

Fig. 7 is a cross-section of the worm approximately on the line 7—7 of Fig. 5, developed rectilinearly;

Fig. 8 is a developed pla of one of the teeth of the hob;

Fig. 9 is a horizontal section through the carriage of the machine.

The principal parts of the machine combined as illustrated are applicable for the cutting of all sorts of spiral threads and gears; the two principal shafts of the machine arranged at a right angle to each other being adapted to receive, one shaft a blank and the other shaft a suitable cutter so that when the two shafts are revolved synchronously at the proper ratio the tool will generate a spiral cut or cuts on the work. By way of example I have illustrated the machine cutting a worm gear and cutting a worm or hob.

Referring first to Figs. 1 and 2, A is a hob which is in use for the cutting of a worm gear B. The shank of the hob is mounted between a tail stock C and a head stock D of any usual or suitable construction carrying a shaft which engages the end of the hob to turn the latter, said shaft being rotated by means of a gear E on its outer end which engages a gear F on a shaft G which carries at its outer end a large gear H engaging a gear J which in turn is driven by means of a pinion K on a shaft L which runs transversely through the machine and carries a cone pulley M at its opposite end by which it is driven. The shaft G with its gears and the gear J are carried on a plate M' which is pivoted on the shaft L so as to facilitate a change in the gears between the driving shaft L and the shaft of the head stock, as is well understood in the art.

The shaft of the head stock is indicated in dotted lines at E' (Fig. 1).

The shaft N which carries the worm gear B, or the blank from which such worm gear is being cut extends at right angles to the shaft E' and through a vertically movable carriage O and is provided at its rear end with a worm gear P which is driven by a worm Q on a vertical shaft R mounted in bearings on a side frame of the machine and driven through beveled pinions S and S' from the shaft L.

The carriage or slide O (see Figs. 1 and 9) comprises a front plate with gibs on its edges for taking up wear, which front plate has a vertical movement of several inches between the straps O' on the front of the machine and the side frames O². The worm gear P is fastened on the shaft by means of nuts O³ and O⁴. The worm Q which operates the gear P is carried in a bracket made fast to the carriage and is splined on the shaft R so as to move up and down with the carriage. The carriage or slide is supported by means of a rod T, the lower end of which is screw threaded through a nut U mounted to rotate in a fixed bearing V mounted on the rear face of the front frame of the machine; the nut U being rotatable, through beveled gears W and W', by means of a hand wheel X at the front of the machine.

The shaft N is first raised by means of the hand wheel X and a blank applied to the shaft N, and a hob applied between the stocks C and D. The machine being started will rotate the blank and the hob so that as the former is lowered the hob will cut the desired spiral teeth. The depth of the cut is increased gradually by the lowering of the work by means of the hand wheel X until the finished depth is reached.

For cutting a worm or a hob the blank is introduced between the stocks C and D and a cutter applied to the end of the shaft N. The cutter is then brought down to the work and the work and cutter rotated as above described, the cutter being fed downward by means of the hand wheel X as the depth of the cut increases.

Referring to the finished worm Y and gear Z of Fig. 5 it will be understood that as the worm rotates each tooth $a$ thereof has its forward end thrust into a groove between two of the teeth $b$ of the gear. For the highest efficiency the teeth of the worm are shaped in cross-section to fit accurately the grooves in the gear; and similarly the teeth of the gear should fit the grooves of the worm. This being the case each tooth which is out of line with the entrance of its groove even by an infinitesimal amount is liable to strike the wall of the groove at one side or the other, opposing a certain resistance to the operation and making a noise which should not exist in a theoretically perfect gearing. In order to avoid this noise and inefficiency I prefer to relieve the teeth of either the worm or the worm gear or both by tapering them slightly as shown in Fig. 6 at both ends, so that the end of each tooth will clear the walls of the groove which it is entering and will come to a full bearing against the walls of such groove gradually. The amount of relief necessary in accurately made apparatus is very little. It is important, however, that this part of the teeth should be accurately cut and that the relief or taper should be nicely graduated and should be uniform for all of the teeth of a worm or gear. The relief referred to is of particular importance in the worm since the latter is usually made of hardened steel; whereas the worm gear is ordinarily of bronze or other comparatively soft metal and the ends of its teeth soon wear to a slight taper in use.

Hobs for cutting such worms should be made with the ends of their teeth correspondingly flared, as in Fig. 8. The end of each spiral tooth of a hob cuts the end portion of the teeth of the worm or worm gear upon which it is operating, and the intermediate portion of the tooth of the hob cuts the intermediate portion of the groove in the work. Since in order to produce teeth which are tapered as at $a$ the grooves between such teeth must be flared at the ends, the hob tooth A' of Fig. 8, which cuts such grooves, will produce the desired teeth on the work, tapered at their ends as indicated.

Instead of using a hob the worm or worm gear may be cut with a single cutter as in Figs. 3 and 4, or a hob may be cut therewith, and in this connection I have illustrated an addition to the machine by which it automatically and with perfect uniformity and accuracy shapes the ends of the teeth of a worm or a hob in the manner above described; or in fact, by the use of a suitably shaped cam, can be used to shape the teeth of the work to any one of a great variety of contours. In this construction the shaft N is supported in a carriage O which is vertically guided as in the previously described construction, and is raised and lowered by means of a rod T as before. The rod T, however, supports the carriage O through the intermediation of an equalizing lever $c$, the rear arm of which carries a pivoted saddle $d$ bearing against the underside of the carriage and the forward end of which is guided between flanges $e$ fastened on the carriage O and projecting below the same. The lever $c$ is in two parts lying on opposite sides of the rod T, as shown in Fig. 4, and carries at its forward end a roller $f$ adapted, when the lever is raised as hereinafter described, to bear against a cam $g$ which is mounted on the shaft just in the rear of the tool holder $h$ which carries the single cutter $j$. The hob to be cut is indicated at $k$. The cam is circular throughout the greater portion of its contour and is formed with a variation in radius along the portion of its contour which bears on the supporting block $f$ or forward end of the lever $c$ while the cutter $j$ is in engagement with the work $k$. The shape of this effective portion of the cam will depend upon the character of the movement necessary to cut the teeth of the work as desired. In the case illustrated the cam is provided with a flat portion $l$ which causes the tool to enter the work with a cut of minimum depth, to cut to a gradually increasing depth toward the middle of the work and to cut to a gradually decreasing depth as it leaves the work. This will produce a hob with grooves tapered at the ends in width and with teeth flared at the ends in width, as in Fig. 8.

The machine is easily adjustable to secure this automatic taper on the teeth, or to be fed by hand only and to cut teeth of uniform width. For this adjustment it is only necessary to bring the lever $c$ into play against the cam, or to withdraw the lever from operative position and to support the carriage directly on the hand operated rod T. As shown in Fig. 3ª the lever $c$ is mounted eccentrically on its pivot pin $l$ and this pin is provided with a handle $m$ accessible from the open rear of the machine. In the position of Fig. 3 the lever is lowered so that the carriage rests on the top of the rod T and the cam at all points clears the roller $f$, so that the automatic tapering action is eliminated. By swinging the handle $m$ to the rear, however, the eccentric portions of the pivot pin will lift the lever to first bring the roller up against the cam and then lift the carriage off the end of the rod sufficiently to cause the cam to bear at all times on the roller.

The action of the lever $c$ is to divide the throw of the cam so that the total movement of the carriage O and the cutter in a vertical direction will be only a determined fraction of the throw of the cam. When the flat portion $l$ of the cam arrives at the roller $f$ on the forward end of the lever the cam starts to fall. The falling movement of the cam carries with it the entire carriage O which presses down the rear end of the lever $c$ and lifts the roller $f$ to meet the descending cam. Supposing the two arms of the lever $c$ to be of equal length, then the actual movement of the cutter would be one-half the throw of the cam. Thus any error in the contour of the cam is reduced by half, so that the greatest precision is secured.

In cutting a worm instead of the hob $k$ the cam will be shaped to lift the cutter at the intermediate portion of its cutting movement and to lower it at the beginning and end of such movement so as to make the grooves in the work flare toward the ends and the teeth taper toward the ends.

The cutter $j$ is of sufficient depth to clear the outer edges of the teeth of the work, as indicated in Fig. 7, so that it does not alter the radial depth of such teeth from end to end, but only takes off a greater or less portion of the metal from the sides of the teeth. This mechanism for varying the width of the cut has the advantage of preserving the radius of rotation of the cutter uniform at all times, since its axis of rotation rises and falls. As the rate of rotation of this shaft is constant, it follows that the linear velocity of the cutter is constant and as it moves across from end to end it cuts a groove which, though flared at the ends, has its center line on a true spiral,—a point of great importance in securing efficiency and smooth running of the worm.

The multiple thread or mutiple toothed worm of Fig. 5 should be cut, for speed, with a hob or cutter having the same number of teeth. These tools may be developed from the fly cutter and apparatus of Fig. 3 in the following manner: The ratio between the rates of rotation of the hub $k$ and the cutter head $h$ should be incommensurable so that the cutter in its successive engagements with the work will cut first one and then another of the teeth. For example, the parts may be so geared as to make four turns of the cutter head to thirty-nine turns of the worm, or one to nine and three-quarters. Because of the fractional relation any certain tooth of the work would be operated on by the cutter only once in each fourth revolution of the latter. In this way a four-tooth hob would be generated. Working backward from this hob on the same machine a cutter, the blank being mounted on the shaft N, could be generated having the number of teeth desired, and this cutter could in turn be used to generate worms of the same dimensions as the hob originally produced by the single cutter.

Though I have described with great particularity of detail certain embodiments of my invention yet it is not to be understood therefrom that the invention is restricted to the particular embodiments illustrated. Various modifications thereof within the scope of the appended claims may be made by those skilled in the art without departure from the invention. The worm and the cutter described above are not claimed in the present application, but it is not to be inferred therefrom that I thereby waive my right to claim the same in a separate application.

What I claim is -

1. A machine for cutting hobs, worms or the like adapted to revolve the cutter and the work on axes at an angle to each other so as to cause the cutter to make a spiral cut in the work, said machine including means for automatically shifting one of said axes toward and away from the other during the engagement of the cutter with the work.

2. A machine for cutting hobs, worms or the like adapted to revolve the cuttter and the work on axes at an angle to each other so as to cause the cutter to make a spiral cut in the work, said machine including means for automatically shifting one of said axes toward and away from the other during the engagement of the cutter with the work, said cutter being tapered and shaped so as to clear the outer edge of the teeth at all times, whereby said movement of the axes results in a variation of the width of the teeth without variation of their depth.

3. A machine for cutting hobs, worms or the like adapted to revolve the cutter and the work on axes at an angle to each other so as to cause the cutter to make a spiral cut in the work, said machine including a rotating cam by which one of said axes is moved toward and from the other during the engagement of the cutter with the work.

4. A machine for cutting hobs, worms or the like adapted to revolve the cutter and the work on axes at an angle to each other so as to cause the cutter to make a spiral cut in the work, said machine comprising in combination shafts arranged on the said axes, a carriage in which one of said shafts is carried, supporting means for said carriage and means for moving said carriage toward and from the other shaft as its shaft is rotated.

5. A machine for cutting hobs, worms or the like adapted to revolve the cutter and the work on axes at an angle to each other so as to cause the cutter to make a spiral cut in the work, said machine comprising in combination shafts arranged on the said axes, a carriage in which one of said shafts is carried, supporting means for said carriage and an equalizer between said carriage and said supporting means to permit the carriage to be moved with a parallel movement relatively to the supporting means.

6. A machine for cutting hobs, worms or the like adapted to revolve the cutter and the work on axes at an angle to each other so as to cause the cutter to make a spiral cut in the work, said machine comprising in combination shafts arranged on the said axes, a carriage in which one of said shafts is carried, supporting means for said carriage, an equalizing lever carried by said supporting means and engaging said carriage at one end and a cam mounted on the shaft within said carriage and adapted to engage the other end of said lever.

7. A machine for cutting hobs, worms or the like adapted to revolve the cutter and the work on axes at an angle to each other so as to cause the cutter to make a spiral cut in the work, said machine comprising in combination shafts arranged on the said axes, a carriage in which one of said shafts is carried, supporting means for said carriage, an equalizer between said carriage and said supporting means to permit the carriage to be moved with a parallel movement relatively to the supporting means and means for shifting said equalizer to an inoperative position.

8. A machine for cutting hobs, worms or the like adapted to revolve the cutter and the work on axes at an angle to each other so as to cause the cutter to make a spiral cut in the work, supporting means for said cutter, a cam by which one of said axes is moved toward and from the other during the engagement of the cutter with the work, and means for dividing the throw of the cam so that the total movement produced will be only a determined fraction of such throw.

9. A machine for cutting hobs, worms or the like adapted to revolve the cutter and the work on axes at an angle to each other so as to cause the cutter to make a spiral cut in the work, said machine comprising in combination shafts arranged on the said axes, a carriage in which one of said shafts is carried, supporting means for said carriage, an equalizing lever $c$ carried by the supporting means and engaging said carriage at its rear end, a cam $g$ carried near the forward end of the shaft in said carriage and adapted to engage the forward end of said lever, whereby as the shaft in said carriage rotates the carriage is lifted and lowered relatively to its supporting means by an amount less than the throw of the cam.

10. A machine for cutting hobs, worms and the like comprising a tapered cutter having a uniform linear velocity, means for generating a relative spiral movement between the cutter and the work, and means for effecting a relative movement of the cutter toward or away from the work during a cutting operation so as to produce a tooth of varying width at different points in its length.

11. A machine for cutting hobs, worms and the like comprising a cutter, means for generating a relative spiral movement between the cutter and the work, and means for effecting a relative movement of the cutter toward or away from the work during a cutting operation while maintaining a constant relative linear velocity of the cutter.

12. The method of cutting hobs, worms, and the like which consists in generating a relative movement between an oblique cutting edge and the work in the direction of the desired tooth and effecting a relative movement of the cutting edge toward or away from the work during a cutting operation while maintaining a constant relative linear velocity of such cutting edge.

13. The method of cutting hobs, worms and the like which consists in generating a relative spiral movement between an oblique cutting edge and the work and effecting a relative movement of the cutting edge toward or away from the work during a cutting operation while maintaining a constant relative linear velocity of such cutting edge.

In witness whereof, I have hereunto signed my name in the presence of two subscribing witnesses.

WILLIAM CANNELL.

Witnesses:
 THEO. W. ELLIS,
 ELISHA H. BREWSTER.